US012479214B2

(12) United States Patent
Tokunaga

(10) Patent No.: US 12,479,214 B2
(45) Date of Patent: Nov. 25, 2025

(54) IMAGE FORMING APPARATUS, IMAGE READING DEVICE, AND LIQUID DISCHARGE DEVICE

(71) Applicant: Yusuke Tokunaga, Kanagawa (JP)

(72) Inventor: Yusuke Tokunaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 18/205,821

(22) Filed: Jun. 5, 2023

(65) Prior Publication Data

US 2023/0398786 A1 Dec. 14, 2023

(30) Foreign Application Priority Data

Jun. 14, 2022 (JP) ................................ 2022-095886

(51) Int. Cl.

| | |
|---|---|
| ***B41J 2/21*** | (2006.01) |
| ***B41J 25/00*** | (2006.01) |
| ***B41J 25/34*** | (2006.01) |

(52) U.S. Cl.

CPC ............. *B41J 2/2146* (2013.01); *B41J 25/34* (2013.01); *B41J 2025/008* (2013.01)

(58) Field of Classification Search

CPC ........... G03G 21/1609; G03G 21/1633; G03G 21/1604; G03G 2221/1687; B41J 2025/008; B41J 2/2146; B41J 2202/21; B41J 25/34; G06K 15/16; B65H 2402/44; B65H 2553/40; B65H 5/025

See application file for complete search history.

(56) References Cited

U.S. PATENT DOCUMENTS

2023/0030207 A1 2/2023 Yamamoto et al.

FOREIGN PATENT DOCUMENTS

| | | |
|---|---|---|
| JP | 2015-119388 | 6/2015 |
| JP | 2016-105546 | 6/2016 |
| JP | 2016105546 A * | 6/2016 |
| JP | 2021-180436 | 11/2021 |
| WO | WO2017/169507 A1 | 10/2017 |

* cited by examiner

*Primary Examiner* — Jannelle M Lebron

(74) *Attorney, Agent, or Firm* — Duft & Bornsen, PC

(57) ABSTRACT

An image forming apparatus includes: a housing having an opening; a drum configured to rotate around a rotation axis to convey a medium in a conveyance direction; an image former configured to form an image on the medium on the drum; a reader downstream of the image former in the conveyance direction, the reader configured to read the image on the medium formed by the image former; a first space accommodating the reader; a second space downstream of the first space in the conveyance direction; a path between the first space and the second space; and a shield configured to openably close the path. The image former and the reader are radially arranged with respect to the rotation axis of the drum.

9 Claims, 11 Drawing Sheets

IMAGE FORMING APPARATUS, IMAGE READING DEVICE, AND LIQUID DISCHARGE DEVICE

CROSS-REFERENCE TO RELATED APPLICATIONS

This patent application is based on and claims priority pursuant to 35 U.S.C. § 119(a) to Japanese Patent Application No. 2022-095886, filed on Jun. 14, 2022, in the Japan Patent Office, the entire disclosure of which is hereby incorporated by reference herein.

BACKGROUND

Technical Field

The present disclosure relates to an image forming apparatus, an image reading device, and a liquid discharge device.

Related Art

Many image forming apparatuses include an image reader that reads an image formed on a recording medium. Such image forming apparatuses provided with an image reader serve to read and inspect an image formed on a recording medium and correct the image forming process based on the inspection results. This allows the image forming apparatuses to form higher quality image.

SUMMARY

Embodiments of the present disclosure provide an image forming apparatus includes: a housing having an opening; a drum configured to rotate around a rotation axis to convey a medium in a conveyance direction; an image former configured to form an image on the medium on the drum; a reader downstream of the image former in the conveyance direction, the reader configured to read the image on the medium formed by the image former; a first space accommodating the reader; a second space downstream of the first space in the conveyance direction; a path between the first space and the second space; and a shield configured to openably close the path. The image former and the reader are radially arranged with respect to the rotation axis of the drum.

Embodiments of the present disclosure provide an image reading device includes: a reader configured to read an image formed by an image former on a medium conveyed by a drum in a conveyance direction; a first space accommodating the reader; a second space downstream of the first space in the conveyance direction; a path between the first space and the second space; and a shield configured to openably close the path. The reader is: radially arranged with respect to a rotation axis of the drum; and disposed downstream of the image former in the conveyance direction.

Embodiments of the present disclosure provide a liquid discharge apparatus includes: a housing having an opening; a drum configured to rotate around a rotation axis to convey a medium in a conveyance direction; a liquid discharge head configured to discharge a liquid onto the medium to form an image on the medium on the drum; a reader downstream of the liquid discharge head in the conveyance direction, the reader configured to read the image on the medium formed by the liquid discharge head; a first space accommodating the reader; a second space downstream of the first space in the conveyance direction; a path between the first space and the second space; and a shield configured to openably close the path. The liquid discharge head and the reader are radially arranged with respect to the rotation axis of the drum.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
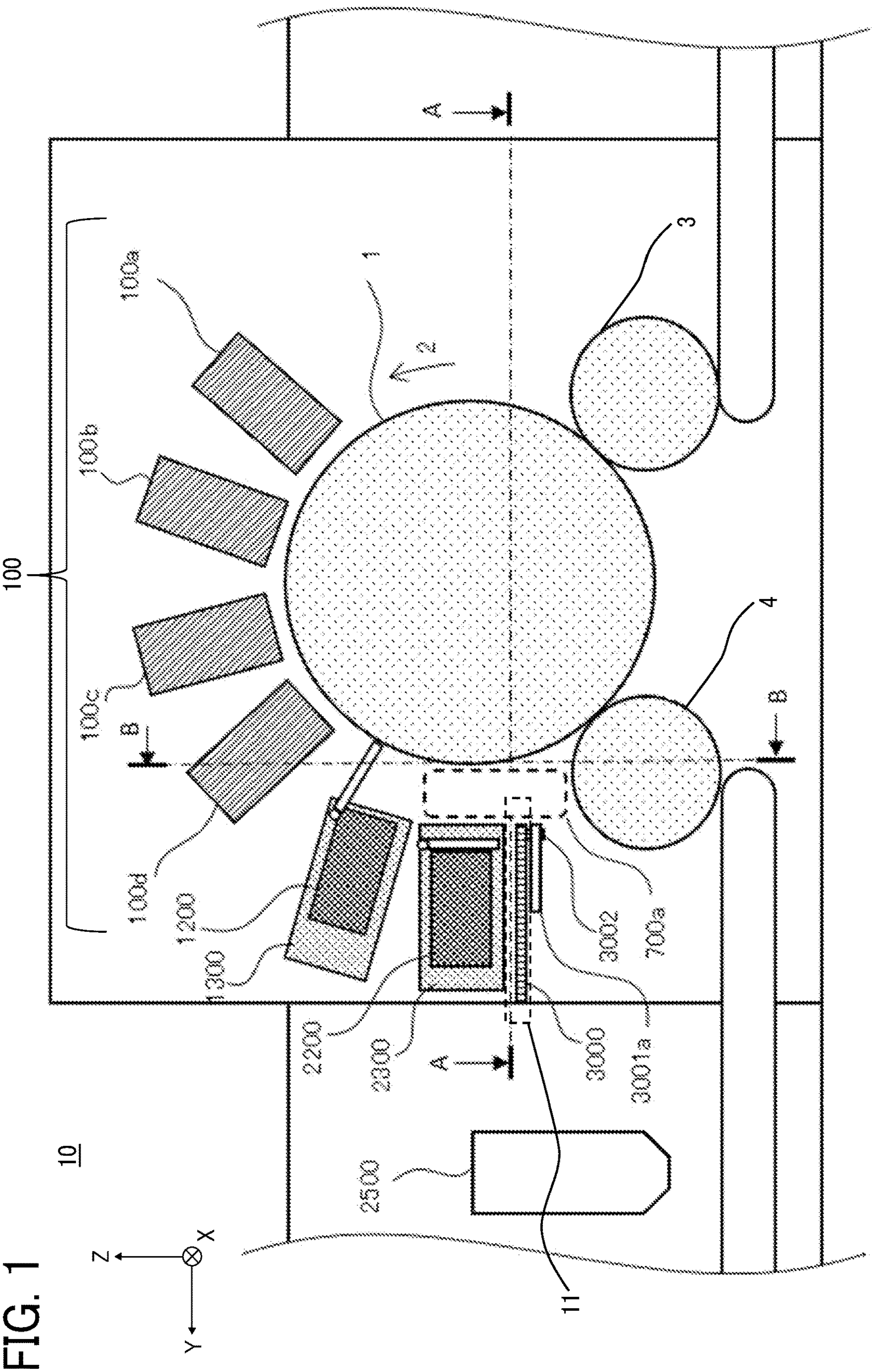
FIG. 1 is a diagram of an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Typical image forming apparatuses employ an inkjet printing system that discharges liquids to a recording medium to form an image. In an image forming process employing the inkjet printing system, a dryer may be disposed in front or rear of the image reader (i.e., upstream or downstream of a recording medium in the conveyance direction) to dry a liquid drop attached to the recording medium. Such an arrangement limits the installation space of each device including a reading device. Particularly the image reader, which reads images using light reflected from the image-forming surface of the recording medium after being emitted to the image-forming surface, might be difficult to adjust its orientation, e.g., to rotate to have its optical axis perpendicular to the image-forming surface. In one comparative example, an image reader incorporating an image informing apparatus is known to include a mover that moves the scanner in a direction perpendicular to the optical axis of the reference plane and in a direction parallel to the optical axis. Such an image reader can obtain a desired white reference data irrespective of the limitations on the installation space.

In another comparative example, the image forming apparatus, which includes multiple scanners (or image readers) arranged in a staggered manner, connects multiple images read by the multiple scanners to each other to obtain a document image having no joint misalignment.

In the image forming apparatus according to said one comparative example, the image former, the image reader, and another device are arranged in the conveyance direction of the recording medium. The selection of the arrangement of the image reader may be limited depending on the relative position between the devices. Particularly when the multiple image readers are arranged in the conveyance direction in the image forming apparatus according to said another comparative example, at least one scanner is disposed at a position that is not suitable for maintenance or a position that is difficult for a user to reach. If the image reader is disposed at such a position difficult for a user to reach, removing dirt adhering to the image reading mechanism is difficult. In other words, the configurations according to the comparative examples as described above have a challenge in cleaning the image reader included in the image forming apparatus because there is not space left for the user's hand or cleaning tool to enter.

Embodiments of the present disclosure achieves higher efficiency in cleaning the image reader.

The following is described with reference to figures as illustrated below. The embodiments of the present disclosure are not limited to the following described examples.

Configuration Example of Image Forming Apparatus

FIG. 1 is a diagram of an overall configuration of an image forming apparatus 10 according to an embodiment of the present disclosure. In FIG. 1, a Z-axis direction is a direction (or a vertical direction) vertical to an installation surface on which the image forming apparatus is installed. Further, an X-axis direction is a front-rear direction or the depth direction of the image forming apparatus 10, being orthogonal to the Z-axis direction. A Y-axis direction is a left-right direction orthogonal to each of the Z-axis direction and the X-axis direction in a plane parallel to the drawing sheet of FIG. 1. The Y-axis direction corresponds to a conveyance direction 2 (in FIG. 1) of the recording medium in the present embodiment. In the present disclosure, the X-axis direction may be simply referred to as an orthogonal direction. In the following described example, the orthogonal direction (i.e., the X-axis direction) is coincident with a rotation axis, i.e., the axial direction of a drum-shaped member.

The image forming apparatus 10 includes a drum-shaped conveyor that conveys a recording medium. In the present disclosure, the recording medium is referred to as a sheet. Further, the drum-shaped member is referred to as a drum 1.

The sheet is conveyed in a predetermined direction along the outer circumferential surface of the drum 1, and an image is formed on the sheet by an image former 100 during the conveyance.

The image forming apparatus 10 includes an image former 100 including a first inkjet head 100*a*, a second inkjet head 100*b*, a third inkjet head 100*c*, and a fourth inkjet head 100*d*, which are arranged along the outer circumferential surface of the drum 1.

The image former 100 may include multiple inkjet heads, or may include a single inkjet head. The image former 100 may be configured to include a device other than the inkjet head.

The first inkjet head 100*a*, the second inkjet head 100*b*, the third inkjet head 100*c*, and the fourth inkjet head 100*d* form a liquid discharge head that discharges different ink colors to a sheet. The image former 100 forms an image with different colors of ink.

In the following description, the first inkjet head 100*a*, the second inkjet head 100*b*, the third inkjet head 100*c*, and the fourth inkjet head 100*d* are collectively and simply referred to as inkjet heads.

In the following described example, the image forming apparatus 10 employs an inkjet printing system to form images. However, the image forming apparatus 10 may employ another system other than the inkjet printing system. For example, the image forming apparatus 10 employs a toner system to form images.

Further, the image forming apparatus 10 may include a post-processing device such as a dryer 2500.

FIG. 1 illustrates elements used to describe the embodiments of the present disclosure, but the image forming apparatus 10 includes a configuration other than the configuration illustrated in FIG. 1. In some examples, the image forming apparatus 10 further includes a pre-processing device that executes processing (pre-processing) on a sheet before image formation, a sensor that detects the state of the sheet, and another sensor or functions for executing other processing functions.

Arrangement of Image Former and Reader

In the image forming apparatus 10, the drum 1 rotates in the conveyance direction 2 to convey a recording medium. A conveyor may include multiple drums such as an inlet drum 3 and an outlet drum 4.

The inkjet heads are arranged along the outer circumferential surface of the drum 1 at predetermined intervals. An image is formed in response to the adhesion of ink discharged from the inkjet head onto the sheet conveyed by the drum 1 in the conveyance direction 2.

A scanner as an image reader is disposed downstream of the inkjet head in the conveyance direction 2. As illustrated in FIG. 1, the inkjet heads are arranged radially to the drum 1.

The image forming apparatus 10 includes multiple scanners, a first scanner 1200 and a second scanner 2200, which are arranged radially to the drum 1.

In the following described example, a reader 30 (FIG. 1) of the image forming apparatus 10 includes the first scanner 1200. However, in at least one example, the reader includes a device other than the first scanner 1200.

Upon receiving an input image, the drum 1 and a conveyor roller convey a sheet in the conveyance direction 2 in the image forming apparatus 10. Based on the input image, the inkjet heads discharge inks onto the sheet to form an image. After the image formation, the sheet may be subjected to post-processing such as drying. In addition, the input image may be subjected to image processing by an arithmetic device.

In the following description, the image forming apparatus 10 includes two scanners (the first scanner 1200 and the second scanner 2200). However, the number of scanners as image readers is not limited to two, and may be one or three or more.

In the image forming apparatus 10, the two scanners 1200 and 2200 are supported by different structures. For example, the first scanner 1200 is supported by the first support housing 1300. Similarly, the second scanner 2200 is supported by the second support housing 2300.

Each of the first support housing 1300 and the second support housing 2300 is a part of a housing constituting the image forming apparatus 10. The first support housing 1300 and the second support housing 2300 support structures arranged radially along the outer circumferential surface at predetermined positions with predetermined orientations.

In this configuration, the first support housing 1300 and the second support housing 2300 are both arranged radially to the drum 1 and between the structures arranged on the outer circumferential surface of the drum 1.

The first scanner 1200 and the second scanner 2200 read an image formed by the inkjet heads, i.e., after the formation of the image by the inkjet head. In view of such processing flow, the first scanner 1200 and the second scanner 2200 are disposed downstream of the inkjet head in the conveyance direction 2.

In response to generating image data for inspection, based on the image read by the first scanner 1200 and the second scanner 2200, the image forming apparatus 10 corrects the image data for inspection in the image forming processing.

In this configuration, the first scanner 1200 and the second scanner 2200 are at positions that allow reading of the image immediately after the formation of the image by the inkjet heads.

Such an arrangement of the first scanner 1200 and the second scanner 2200 enables the first scanner 1200 and the second scanner 2200 to quickly read the image formed by the inkjet heads and allows higher quality of the image formed by the image forming apparatus by correcting image data using the reading results. Further, the first scanner 1200 and the second scanner 2200 are disposed substantially downstream of the inkjet head in the conveyance direction 2. This easily eliminates the influence on the conveyance accuracy of the sheet, and may further increase the inspection accuracy.

To arrange the first scanner 1200 and the second scanner 2200 at positions downstream of the inkjet head in the conveyance direction 2, the first scanner 1200 and the second scanner 2200 are arranged radially to the drum 1.

As described above, similarly to the inkjet heads, the first scanner 1200 and the second scanner 2200 are disposed radially to the drum 1 and disposed in the vicinity of the inkjet heads.

In the image forming apparatus 10, a peripheral device such as a dryer may be disposed downstream of the inkjet head. However, the arrangement of the first scanner 1200 and the second scanner 2200 radially to the drum 1 allows a layout of the first scanner 1200 and the second scanner 2200 downstream of and in the vicinity of the inkjet heads in the conveyance direction 2.

Support Portion

As illustrated in FIG. 1, the second scanner 2200 includes a fixed shield plate 3000 and an openably closable shield plate 3001*a*. In the following described example, the fixed shield plate 3000 serves as a support portion 11. The support portion 11 supports the second scanner 2200.

The fixed shield plate 3000 is preferably made of a material including a practical metal such as aluminum, stainless steel, or magnesium. Such a practical metal provides strength sufficient to support a device including a reader by a cantilever structure when the reader is pulled out, and also reduce costs.

In addition, the fixed shield plate 3000 preferably includes a thermal insulating material. The first scanner 1200 and the second scanner 2200 each include an optical unit 33. The optical unit 33 is composed of optical components. A change in temperature affects the optical characteristics. To prevent such an effect on the optical characteristics due to a temperature change, the fixed shield plate 3000 adopts a configuration that protects the first scanner 1200 and the second scanner 2200 from high-temperature gas.

A device for emitting high-temperature gas may be installed under the fixed shield plate 3000. In this arrangement, the fixed shield plate 3000 serves to insulate an upper space in which the first scanner 1200 and the second scanner 2200 are provided, from heat generated in a lower space in which the device for emitting high-temperature gas is provided.

The fixed shield plate 3000 including a thermal insulating material protects the first scanner 1200 and the second scanner 2200 from high-temperature gas. This allows a reduction in a variation in the optical characteristics of the first scanner 1200 and the second scanner 2200 due to a change in temperature and thus achieves higher inspection accuracy.

The upper space is defined as a first space in which a reader is disposed. The lower space is defined as a second space different from the first space in which the reader is disposed.

The fixed shield plate 3000 is a mechanism that separates the first space from the second space. In other words, the first space in which the reader is disposed is protected by the fixed shield plate 3000 from the second space containing the high-temperature gas.

Figure 2:
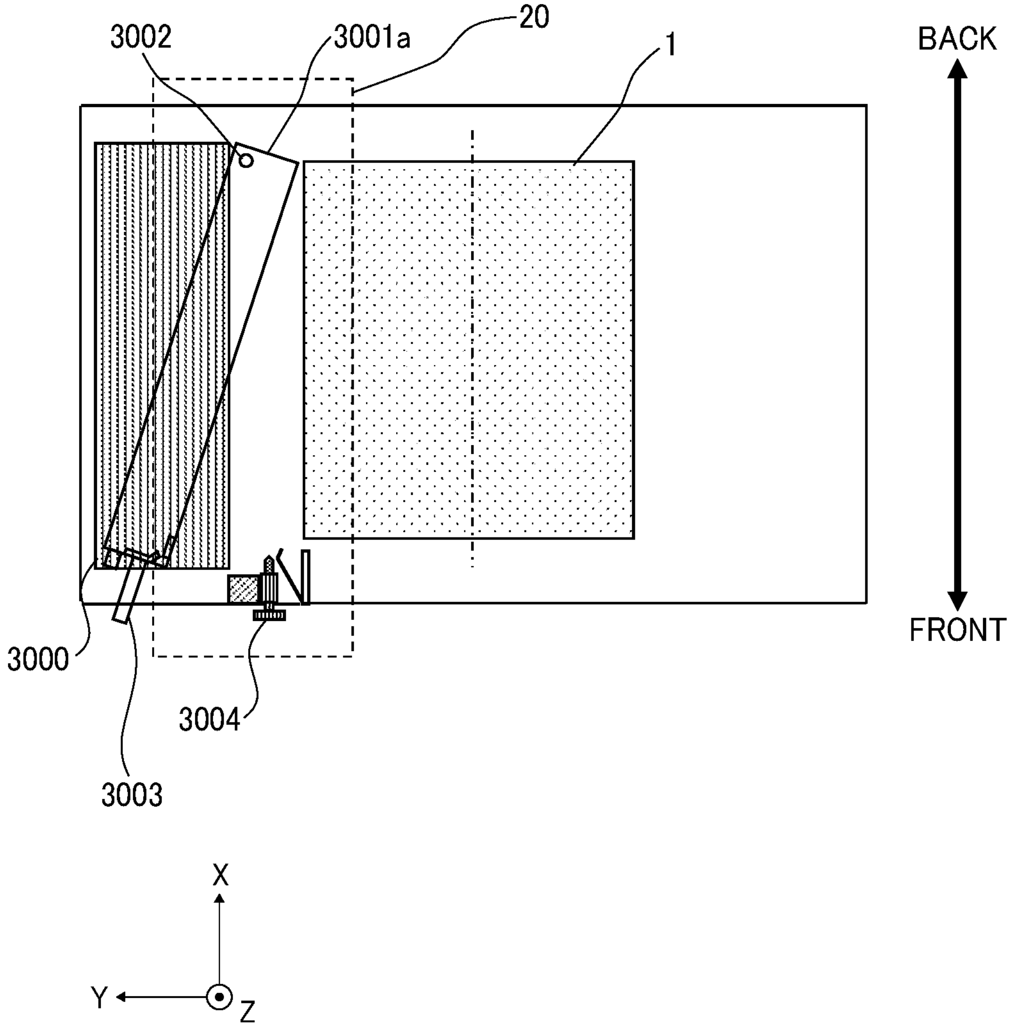
FIG. 2 is an illustration of the openably closable portion that is opened.

FIG. 2 is an illustration of the openably closable portion that is opened. FIG. 2 is a cross-sectional view taken along the line A-A' in FIG. 1 and is a bottom view of the fixed shield plate 3000.

The openably closable shield plate 3001*a* is adjacent to the fixed shield plate 3000 as follows.

In the following described example, the openably closable shield plate 3001*a* constitutes an openably closable portion 20. In at least one example, the fixed shield plate 3000 and the openably closable shield plate 3001*a* are separated from each other and adjacent to each other. In another example, the fixed shield plate 3000 and the openably closable shield plate 3001*a* are integrated together as a single unit.

The openably closable shield plate 3001*a* is opened when cleaning is performed. More specifically, the openably closable shield plate 3001*a* is a mechanism that has a degree of freedom (DOF) to rotate around a fulcrum mechanism 3002.

The openably closable shield plate 3001*a* that is closed to cover a path between the first space and the second space rotates clockwise around the fulcrum mechanism 3002 to open the path as illustrated in FIG. 2.

The openably closable shield plate 3001*a* is desirably configured to be locked by a lock mechanism 3004. More specifically, when the user holds and moves a handle 3003, plungers of the lock mechanisms 3004 are retracted along the guide of the openably closable shield plate 3001*a*. The handle 3003 is locked when fitted into a lock hold.

The handle 3003 is unlocked when the plunger is pulled forward. When the lock is released, the openably closable shield plate 3001*a* is opened as illustrated in FIGS. 1 and 2.

Such locking the openably closable shield plate 3001*a* as described above prevent the openably closable shield plate 3001*a* from being unexpectedly opened due to vibration or the like during machine operation.

Note that the openably closable portion 20 may have a mechanism different from that described above. The openably closable shield plate 3001*a* may have a shape, a DOF, or a rotation center other than those described above.

Such an openably closable portion 20 allows a cleaning operation as follows.

Figure 3:
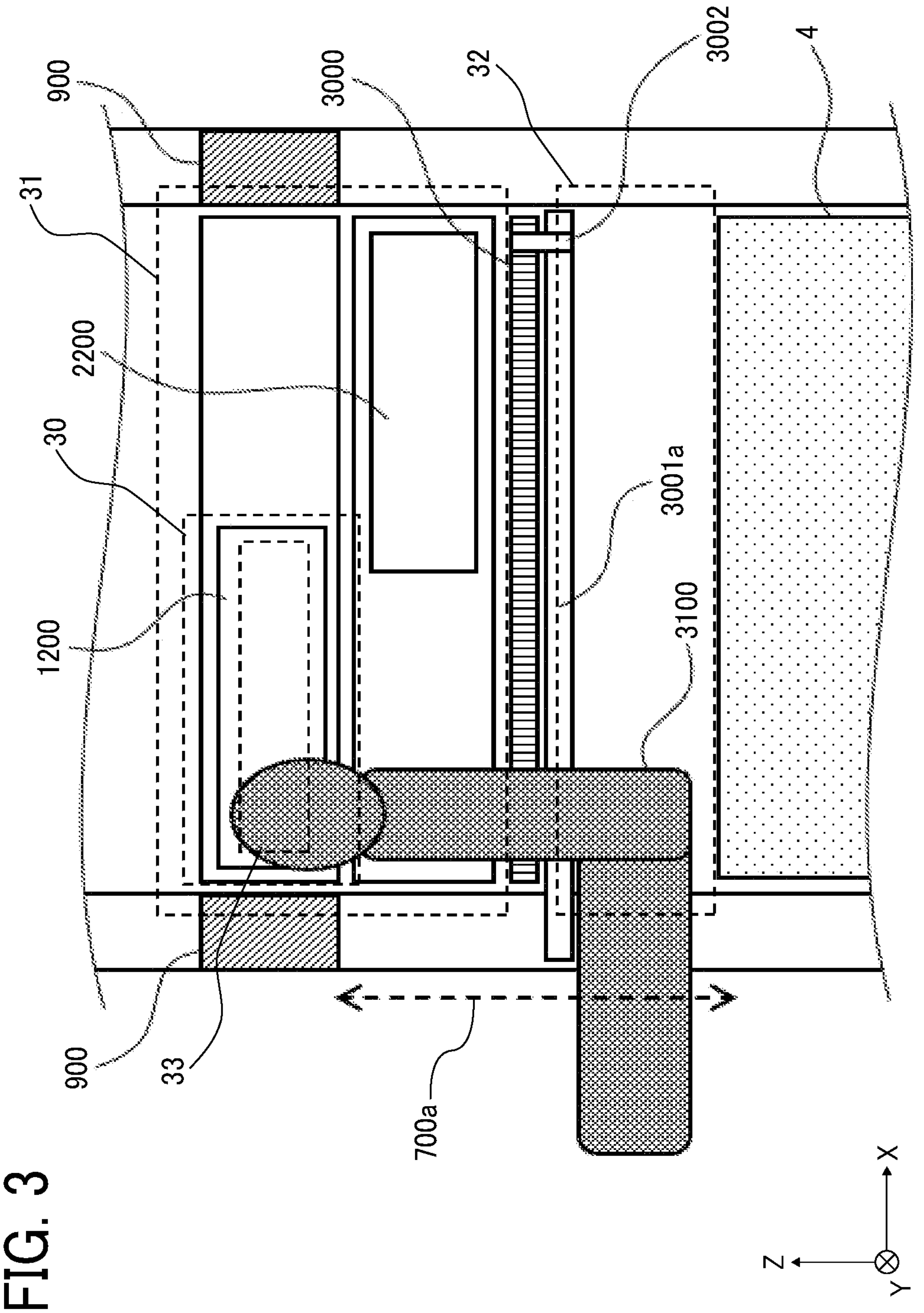
FIG. 3 is an illustration for describing a cleaning operation with the openably closable portion opened, according to an embodiment of the present disclosure.

FIG. 3 is an illustration for describing a cleaning operation with the openably closable portion opened, according to an embodiment of the present disclosure. FIG. 3 is a cross-sectional view taken along line B-B' in FIG. 1.

For example, as illustrated in FIG. 3, cleaning is performed by inserting a user's hand 3100 into a housing 900 through an opening 700*a*. Alternatively, cleaning is performed by putting a cleaning tool into the housing 900 through the opening 700*a*.

As illustrated in FIG. 3, when the openably closable portion is opened, the first space 31 (i.e., the upper portion above the fixed shield plate 3000 in FIG. 3) becomes continuous with the second space 32 (i.e., the second space 32 is between the fixed shield plate 3000 and an outlet drum in FIG. 3. Further, the second space 32 is also between the drum-shaped member and the first space). This forms a workspace through which the user's hand 3100 or the cleaning tool passes. Such a workspace allows a higher degree of efficiency in cleaning the reader by the user.

The openably closable shield plate 3001*a* is closed when an image-forming operation is performed.

Figure 4:
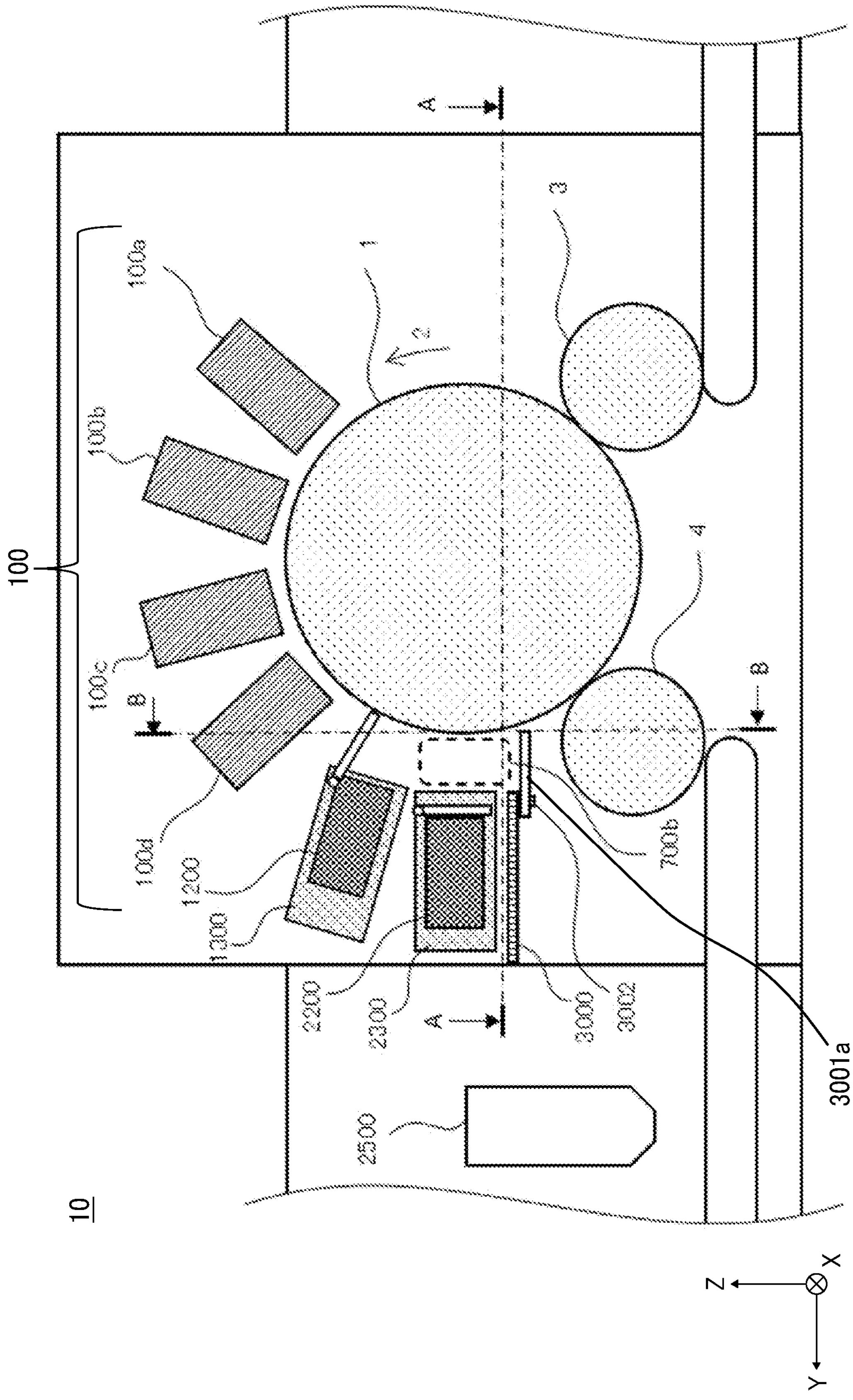
FIG. 4 is an illustration of an openably closable portion that is closed in the image forming apparatus.

FIG. 4 is an illustration of an openably closable portion that is closed in the image forming apparatus 10. FIG. 4 is the cross-sectional view similar to FIG. 1. FIG. 4 differs from FIG. 1 in that the openably closable portion is closed in FIG. 4.

Figure 5:
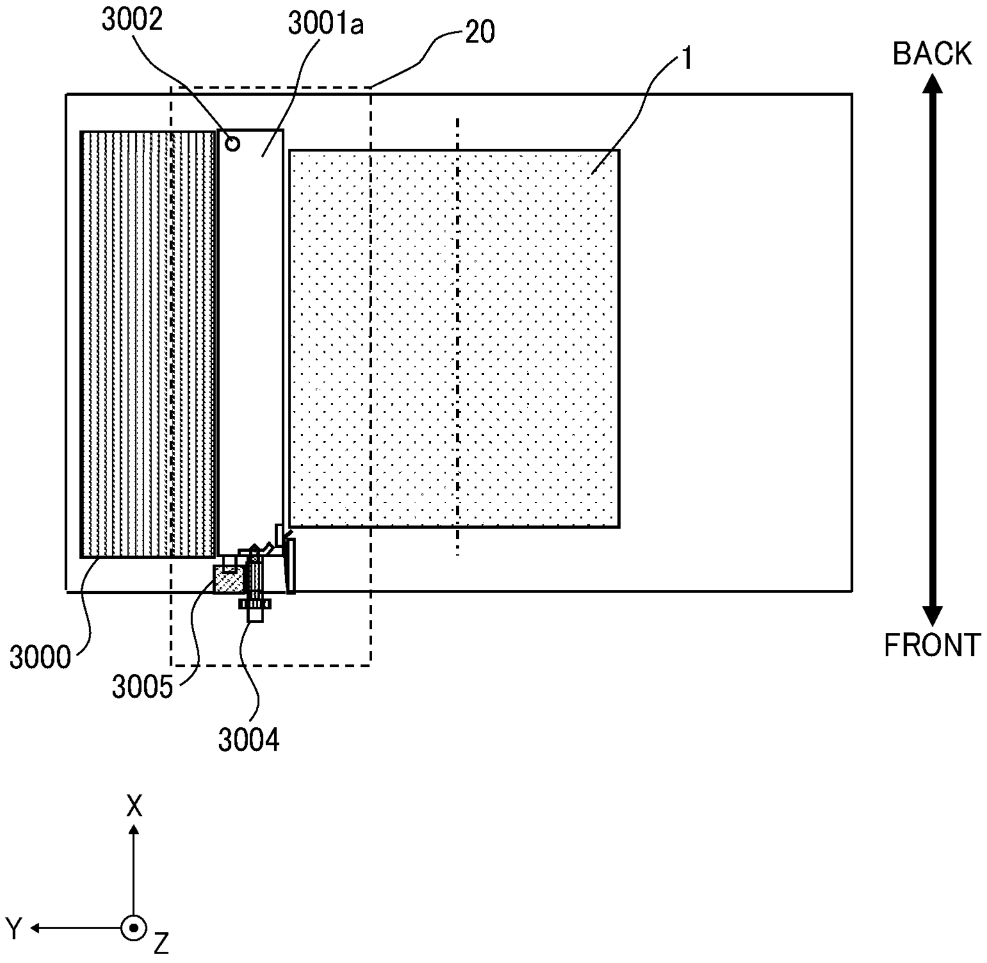
FIG. 5 is an illustration of an openably closable portion that is closed.

FIG. 5 is an illustration of an openably closable portion that is closed. More specifically, a sensor feeler installed on the openably closable shield plate 3001*a* switches between a transparent mode and a block mode for a transmission sensor 3005 to detect the open and closed states of the openably closable shield plate 3001*a*.

The openably closable portion being closed covers the path communicating between the first space 31 and the second space 32.

The openably closable portion 20 being closed as illustrated in FIGS. 4 and 5 allows less amount of high-temperature gas to flow into the first space from the second space. For example, the second space accommodates drying heat or the like generated by the dryer 2500 as a heat source. Thus, the openably closable portion is closed to cover the path for the gas generated from the heat source to flow into the first space, i.e., restrict the high-temperature gas flowing into the first space. This prevents a variation in the characteristics of the optical components included in the reader due to the influence of heat and also prevents a deterioration in reading accuracy.

Figure 6:
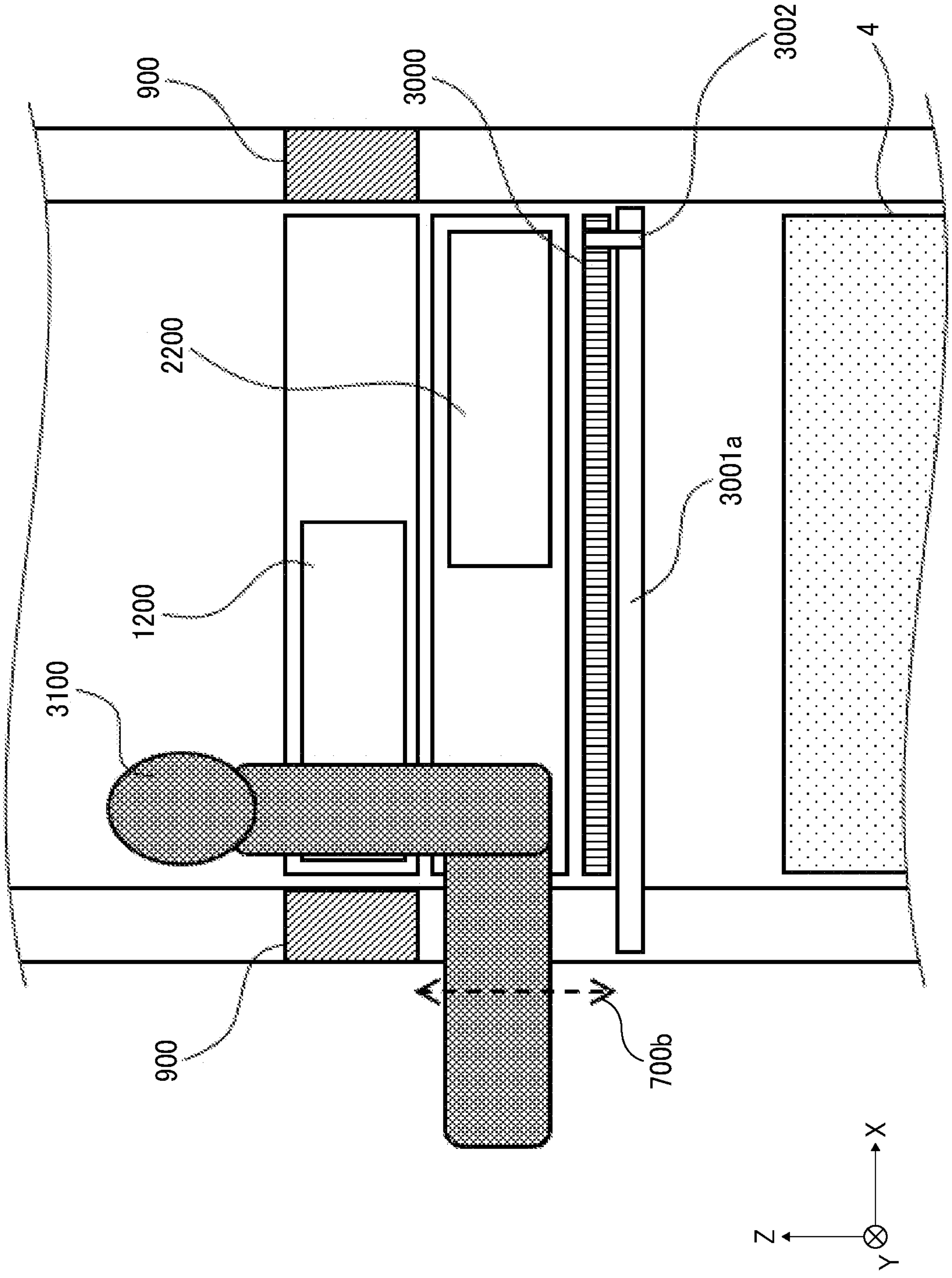
FIG. 6 is a diagram of an opening according to a modification of an embodiment of the present disclosure.

FIG. 6 is a diagram of an opening according to a modification of an embodiment of the present disclosure. In FIG. 6, the housing 900 includes an opening 700*b* through which a user's hand 3100 or the like enters the housing 900. However, the opening 700*b* preferably has a size and a position that allow a user to easily clean the reader. For example, the opening 700*b* is preferably 10 centimeters or wider to accommodate the user's hand 3100.

In addition, the first scanner 1200 that is disposed at a position close to the openably closable shield plate 3001*a* is difficult to clean from the opening 700*b*. In such a case, the opening may be selectively used for cleaning as illustrated in FIG. 3.

Configuration Example of Half-Latch Prevention

Figure 7:
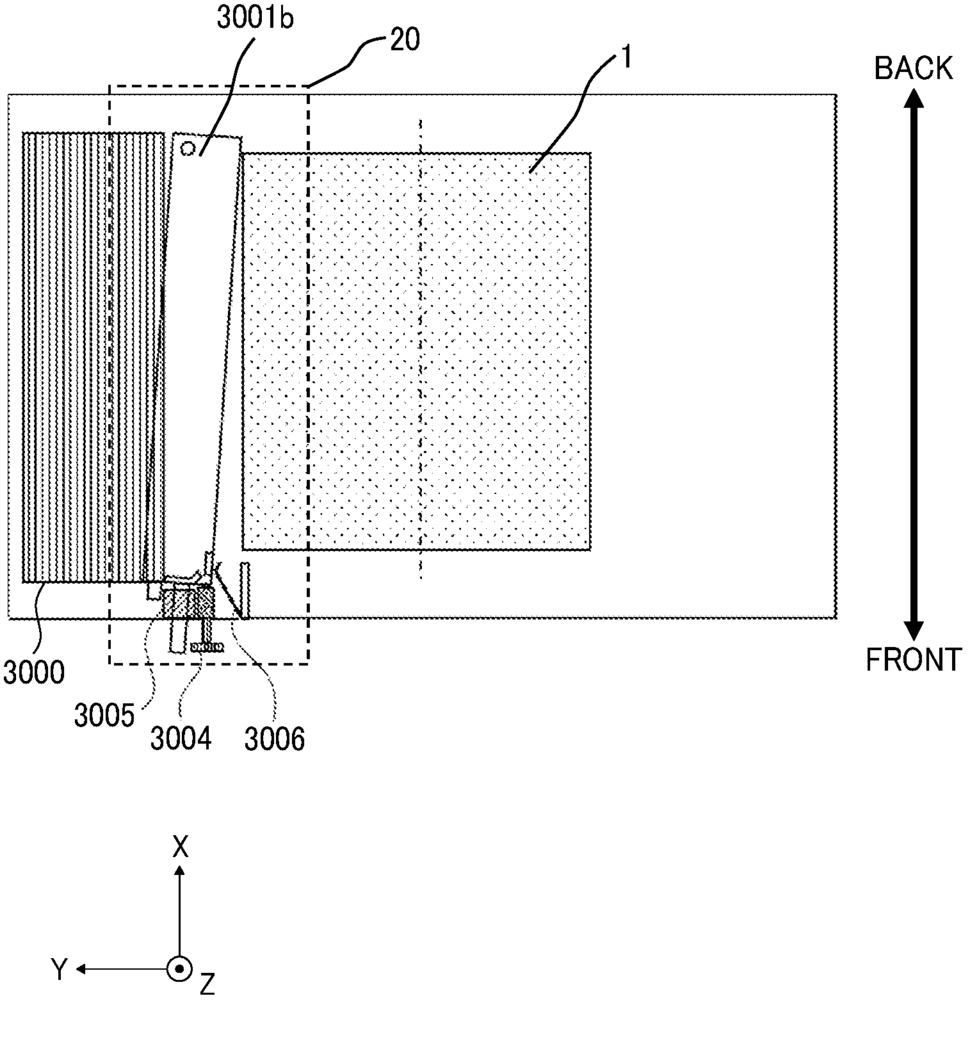
FIG. 7 is a diagram of a configuration of half-latch prevention, according to an embodiment of the present disclosure.

FIG. 7 is a diagram of a configuration of half-latch prevention, according to an embodiment of the present disclosure. Preferably, the image forming apparatus 10 further includes a mechanism for preventing the openably closable shield plate 3001*a* from being half-latched. Specifically, the image forming apparatus 10 includes a spring 3006.

The transmission sensor 3005 is unable to detect the open and closed states when the openably closable shield plate 3001*a* is half-latched, which means that means that the openably closable shield plate 3001*a* is partially opened.

The openably closable shield plate 3001*a* being unlocked is pressed by the spring 3006 in a direction that opens the openably closable shield plate 3001*a*. With the openably closable shield plate 3001*a* unlocked but half-latched, the spring 3006 presses the openably closable shield plate 3001*a* to the detection range of the transmissive sensor 3005. In other words, preventing the openably closable shield plate 3001*a* from being half-latched prevents an erroneous start of the image forming apparatus 10 due to a failure in detecting the transmission sensor 3005 although the openably closable shield plate 3001*a* is open.

Configuration Example of Reader

For example, the first scanner 1200 and the second scanner 2200 have the following configurations.

Figure 8:
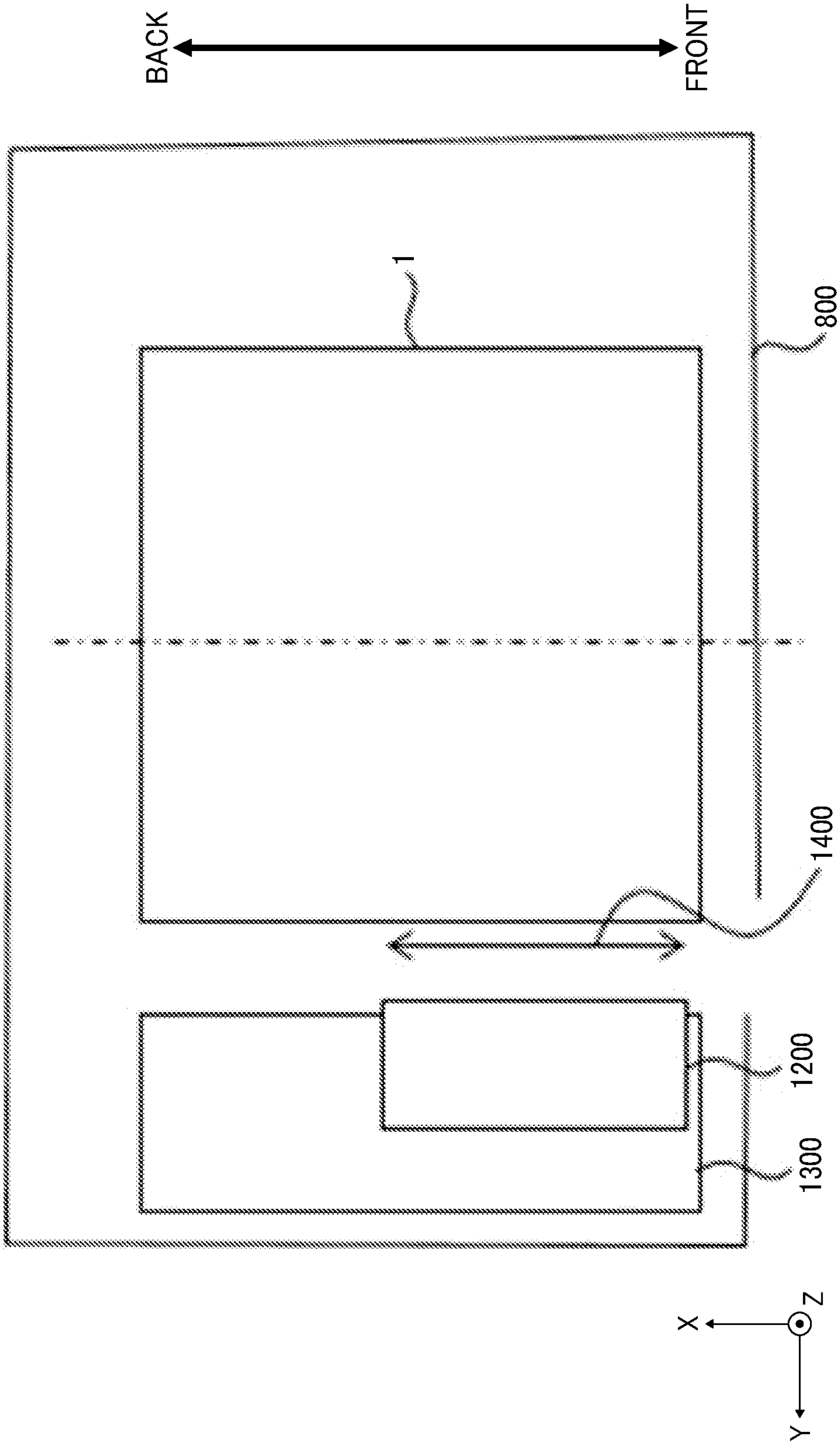
FIG. 8 is a diagram of an arrangement of a first scanner according to an embodiment.

FIG. 8 is a diagram of the arrangement of the first scanner 1200 according to an embodiment of the present disclosure.

Figure 9:
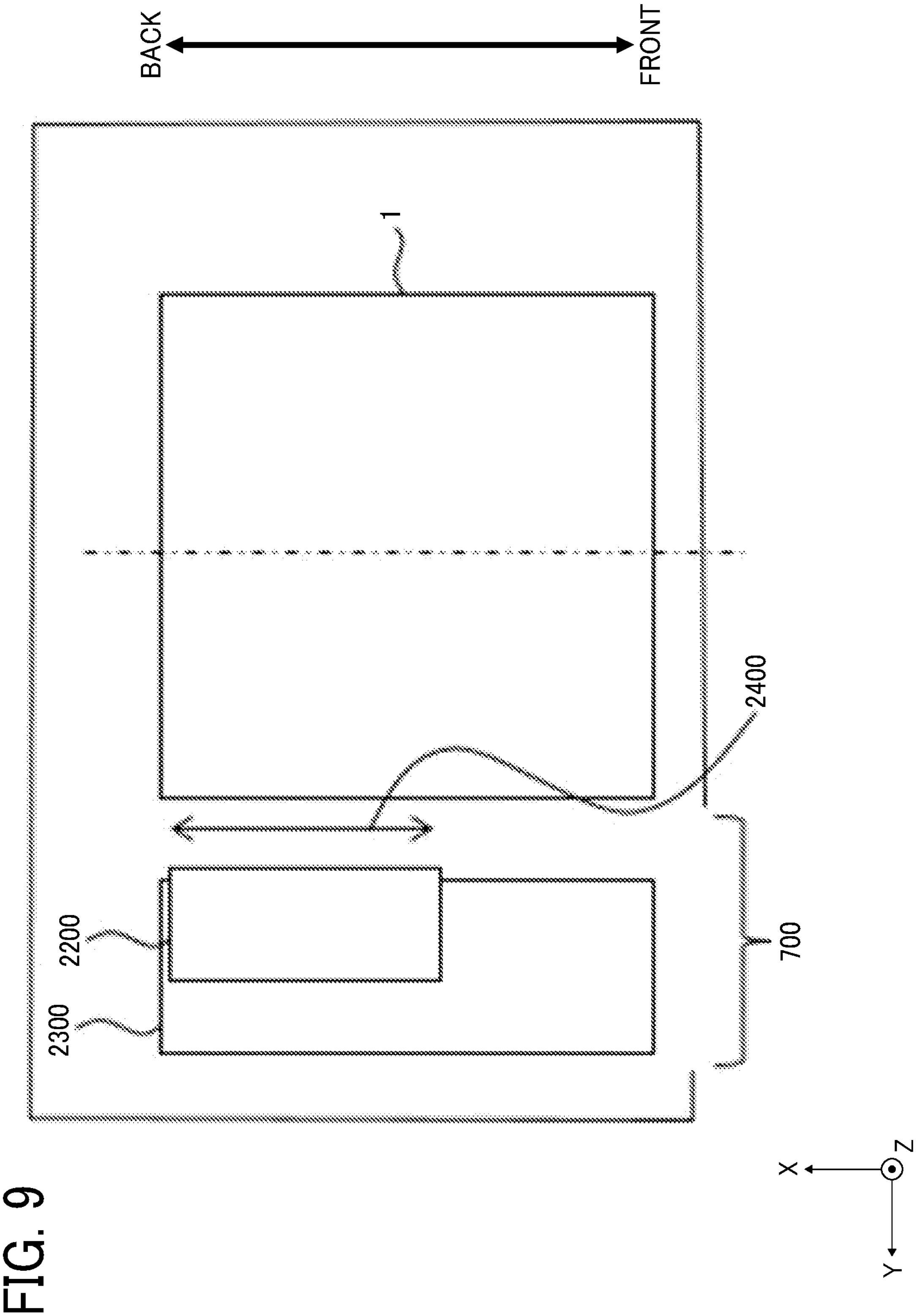
FIG. 9 is a diagram of an arrangement of a second scanner according to an embodiment.

FIG. 9 is a diagram of the arrangement of the second scanner 2200 according to an embodiment of the present disclosure.

The first scanner 1200 and the second scanner 2200 are in-line scanners that read an image in the width direction (i.e., a direction orthogonal to the conveyance direction 2) of the sheet with respect to the conveyance direction 2 (see FIG. 1).

The reading areas in the width direction of the sheet set for the first scanner 1200 and the second scanner 2200 are different from each other.

In the following description, the reading area set for the first scanner 1200 is a first area 1400 in FIG. 8. The reading area set for the second scanner 2200 is a second area 2400 in FIG. 9.

This configuration enables reading of the entire range of the image formed on the sheet by the image forming apparatus 10 by combining the reading results of the first area 1400 and the second area 2400 together.

In the image forming apparatus 10 according to the present embodiment, reading the first area 1400 and the second area 2400 different from the first area 1400 in the direction (that coincides with the width direction of the sheet) orthogonal to the conveyance direction 2 enables a wider entire image reading range and a higher overall reading accuracy irrespective of the use of an inexpensive device that, when used alone, has a limited image reading range. In some examples, the image forming apparatus 10 uses a single reader set to read the entire width of the sheet as the image reading area.

In the present embodiment as described above, the image forming apparatus 10 uses multiple readers: the first scanner

1200 and the second scanner 2200. This configuration enables an image formed on a sheet of, for example, A3 size, B2 size, or a larger size to be read by the image forming apparatus 10. However, the number, arrangement, and reading range of the image reader may be set in accordance with the size of a sheet to be read.

In the following described examples as illustrated in FIGS. 8 and 9, the relative position between the first area 1400 and the second area 2400 is such that the in the −axis direction, the first area 1400 is on the front side, and the second area 2400 is on the backside.

In the arrangement as illustrated in FIG. 8, the second scanner 2200 is on the backside, which means that the second scanner 2200 is away from an opening 700 in the front area of the housing of the image forming apparatus 10.

The opening 700 serves as an entrance for a user to insert his or her hand for maintenance for cleaning the first scanner 1200 or the second scanner 2200. The maintenance for cleaning the first scanner 1200 and the second scanner 2200 uses the opening 700.

The position of the opening 700 is restricted by the relative position between the opening 700 and the support housings supporting the structures arranged radially to the drum 1.

The opening 700 is formed in a housing surrounding the first scanner 1200 and the second scanner 2200.

Configuration of Image Reader

Figure 10:
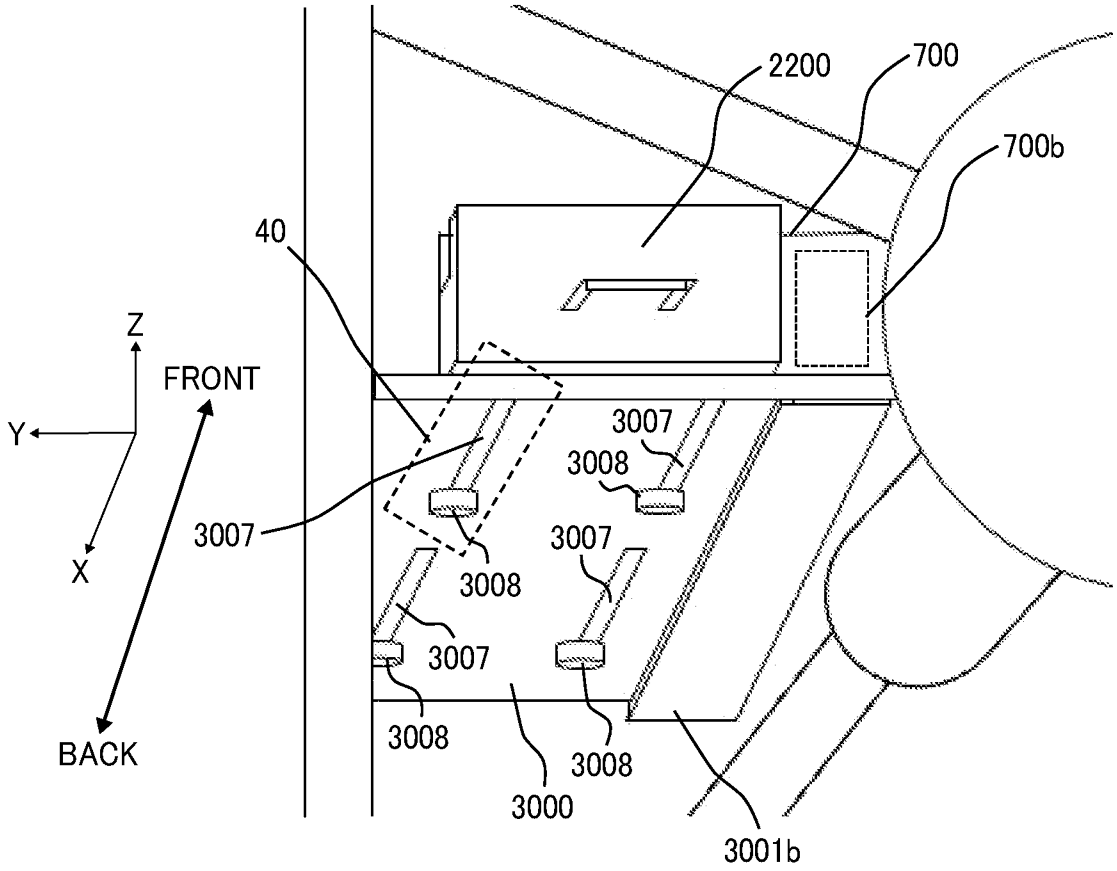
FIG. 10 is a diagram of a configuration of moving the second scanner in FIGS. 9.

FIG. 10 is a diagram of a configuration of moving the second scanner 2200 in FIG. 9, according to an embodiment of the present disclosure. A mover 40 as mechanism moves the second scanner 2200 to the front as described below. It is preferable that the image forming apparatus 10 further includes such a mover 40.

Figure 11:
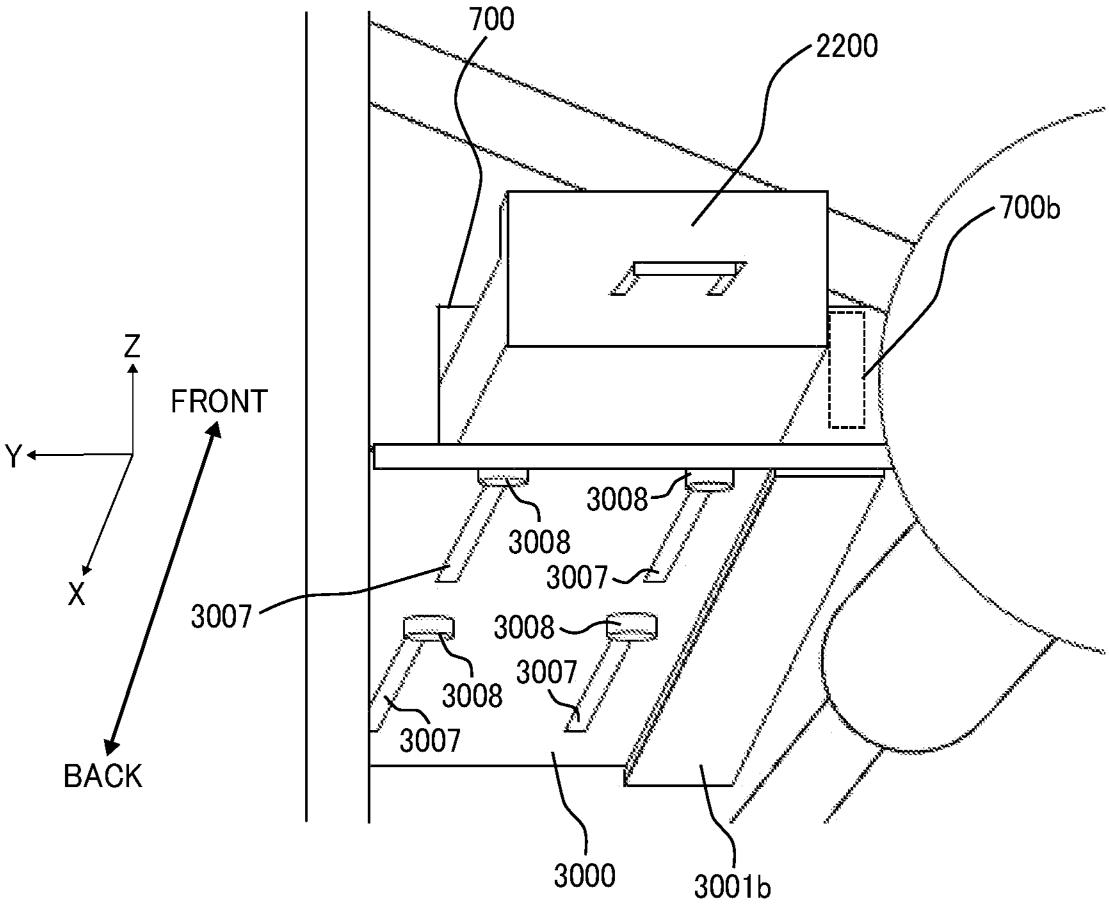
FIG. 11 is a diagram of the second scanner that has been moved, according to an embodiment of the present disclosure.

FIG. 11 is a diagram of the second scanner 2200 that has been moved, according to an embodiment of the present disclosure. FIG. 11 differs from FIG. 10 in that the second scanner 2200 is moved from the position in FIG. 10 to the front. As described above, the mover is a slider or the like that moves the second scanner 2200 in the X-axis direction.

Specifically, the second scanner 2200 moves on a fixed shield plate 3000 in the X-axis direction.

A groove 3007 is formed in the fixed shield plate 3000. In this configuration, the second scanner 2200 is moved in parallel along the groove 3007. Note that the first scanner 1200 may be provided with a support portion other than the fixed shield plate 3000.

Such a configuration that moves the second scanner 2200 in parallel to the front moves the second scanner 2200 to a portion that allows an effective cleaning for maintenance.

In other words, this configuration moves the second scanner 2200 on the backside during the image-forming operation to a position that allows a user to easily reach the second scanner 2200 for maintenance.

Further, since the first scanner 1200 and the second scanner 2200 each include an optical component in the configuration that reads an image, the reading accuracy is degraded by contaminated optical component. In particular, since ink mist is likely to be generated in the vicinity of the inkjet head, if the ink mist adheres to the optical component, image reading accuracy is adversely affected.

In addition to the ink mist, dust also causes contamination of the optical component.

The second scanner 2200 is pulled out by the mover to the front for maintenance. This configuration moves the second scanner 2200 at the backside during the image-forming operation to a position that allows a user to easily reach the second scanner 2200 for cleaning. This enables higher efficiency in user cleaning.

The mover may be a mechanism other than the above-described mechanism. For example, the mover may be configured to use an actuator. Further, when the image forming apparatus 10 includes multiple readers, the mover moves any one of the readers or all of the readers as described below.

The mover moves the second scanner 2200 by a half or more of the entire length of the second scanner 2200 to the front. Such a movement of the second scanner 2200 by a half or more of the entire length of the second scanner 2200 to the front for cleaning allows the user to easily visually confirm whether the second scanner 2200 has been sufficiently cleaned.

The movable distance of the second scanner 2200 is variable with the total length of the second scanner 2200. For a second scanner 2200 having a long total length, the second scanner 2200 is further back on the housing during the image-forming operation. To clean such a second scanner 2200 having a long total length, the mover is configured to move the second scanner 2200 by a longer distance. For the second scanner 2200 having approximately 800 mm in total, for example, the mover is configured to move the second scanner 2200 by 400 mm or longer distance.

The mover includes a mechanism that restricts the movement by a predetermined distance or longer to prevent the second scanner 2200 from being detached from the housing of the image forming apparatus 10 when the second scanner 2200 is pulled out to the front.

Specifically, the mover includes a pin 3008. As illustrated in FIGS. 10 and 11, the pin 3008 is moved with the movement of the second scanner 2200. The pin 3008 is slidably fitted into the groove 3007 formed in the fixed shield plate 3000.

In response to the movement of the second scanner 2200 to the front by the mover, the pin 3008 stops at the edge of the groove 3007 to prevent excessive movement of the second scanner 2200. In other words, the movement distance of the second scanner 2200 is limited by the length of the groove 3007.

The predetermined distance as the upper limit of the movement distance of the second scanner 2200 is set based on the weight, the center of gravity, and the like of the second scanner 2200. Specifically, when a second scanner 2200 having a significant weight is pulled forward a long distance, the weight of the second scanner 2200 may cause the image forming apparatus 10 to fall down or the fixed shield plate 3000 to bend. Restricting the movement of the second scanner 2200 by a predetermined distance or more to deal with such a situation prevents the troubles as described above.

Aspects of the present invention are as follows, for example.

Aspect 1

An image forming apparatus includes: a housing having an opening; a drum configured to rotate around a rotation axis to convey a medium in a conveyance direction; an image former configured to form an image on the medium on the drum; a reader downstream of the image former in the conveyance direction, the reader configured to read the image on the medium formed by the image former; a first space accommodating the reader; a second space downstream of the first space in the conveyance direction; a path between the first space and the second space; and a shield configured to openably close the path. The image former and the reader are radially arranged with respect to the rotation axis of the drum.

Aspect 2

The image forming apparatus according to Aspect 1, further includes multiple readers including the reader, the multiple readers including: a first reader configured to read the image in a first range in an axial direction parallel to the rotation axis; and a second reader configured to read the image in a second range different from the first range in the axial direction.

Aspect 3

The image forming apparatus according to Aspect 1 or 2, further includes a support supporting the reader and thermally insulating the first space from the second space. The support includes the shield.

Aspect 4

The image forming apparatus according to Aspect 1 or 2, further includes a support supporting the reader and thermally insulating the first space from the second space. The shield is adjacent to the support.

Aspect 5

In the image forming apparatus according to any one of Aspect 1 to Aspect 3, the reader is drawable from the opening of the housing in an axial direction parallel to the rotation axis of the drum.

Aspect 6

In the image forming apparatus according to Aspect 5, a drawing movement of the reader is restricted within a predetermined distance in the axial direction, and the predetermined distance is equal to or more of a half of an entire length of the reader in the axial direction.

Aspect 7

The image forming apparatus according to any one of Aspect 1 to Aspect 6, further includes a third space between the first space and the second space, the third space including the path. The second space accommodates a heat source configured to generate gas. The shield is closed to restrict the gas flowing from the second space into the first space. The image former discharges a liquid onto the medium to form the image on the medium. The reader includes an optical portion to read the image.

Aspect 8

An image reading device includes: a reader configured to read an image formed by an image former on a medium conveyed by a drum in a conveyance direction; a first space accommodating the reader; a second space downstream of the first space in the conveyance direction; a path between the first space and the second space; and a shield configured to openably close the path. The reader is: radially arranged with respect to a rotation axis of the drum; and disposed downstream of the image former in the conveyance direction.

Aspect 9

A liquid discharge apparatus includes: a housing having an opening; a drum configured to rotate around a rotation axis to convey a medium in a conveyance direction; a liquid discharge head configured to discharge a liquid onto the medium on the drum to form an image on the medium; a reader downstream of the liquid discharge head in the conveyance direction, the reader configured to read the image on the medium formed by the liquid discharge head; a first space accommodating the reader; a second space downstream of the first space in the conveyance direction; a path between the first space and the second space; and a shield configured to openably close the path. The liquid discharge head and the reader are radially arranged with respect to the rotation axis of the drum.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:
- a housing having an opening;
- a drum configured to rotate around a rotation axis to convey a medium in a conveyance direction;
- an image former configured to form an image on the medium on the drum;
- a reader downstream of the image former in the conveyance direction, the reader configured to read the image on the medium formed by the image former;
- a first space accommodating the reader;
- a second space downstream of the first space in the conveyance direction;
- a path between the first space and the second space; and
- a shield configured to openably move toward the drum to close the path when the image former is forming an image on the medium,
- wherein the image former and the reader are radially arranged with respect to the rotation axis of the drum.

2. The liquid discharge apparatus according to claim 1, further comprising multiple readers including the reader, the multiple readers including:
- a first reader configured to read the image in a first range in an axial direction parallel to the rotation axis; and
- a second reader configured to read the image in a second range different from the first range in the axial direction.

3. The liquid discharge apparatus according to claim 1, further comprising:
- a support supporting the reader and thermally insulating the first space from the second space, and
- wherein the support includes the shield.

4. The liquid discharge apparatus according to claim 1, further comprising:
- a support supporting the reader and thermally insulating the first space from the second space,
- wherein the shield is adjacent to the support.

5. The liquid discharge apparatus according to claim 1,
- wherein the reader is drawable from the opening of the housing in an axial direction parallel to the rotation axis of the drum.

6. The liquid discharge apparatus according to claim 1, further comprising a third space between the first space and the second space, the third space including the path,
- wherein the second space accommodates a heat source configured to generate gas,
- the shield is closed to restrict the gas flowing from the second space into the first space, the image former discharges a liquid onto the medium to form the image on the medium, and
- the reader includes an optical portion to read the image.

7. The liquid discharge apparatus according to claim 1, wherein the liquid discharge apparatus comprises an image forming apparatus.

8. An image forming apparatus comprising:
- a housing having an opening;
- a drum configured to rotate around a rotation axis to convey a medium in a conveyance direction;

an image former configured to form an image on the medium on the drum;

a reader downstream of the image former in the conveyance direction, the reader configured to read the image on the medium formed by the image former;

a first space accommodating the reader;

a second space downstream of the first space in the conveyance direction;

a path between the first space and the second space; and a shield configured to openably close the path, wherein the image former and the reader are radially arranged with respect to the rotation axis of the drum, wherein the reader is drawable from the opening of the housing in an axial direction parallel to the rotation axis of the drum;

wherein a drawing movement of the reader is restricted within a predetermined distance in the axial direction, and the predetermined distance is equal to or more of a half of an entire length of the reader in the axial direction.

9. An image reading device comprising:

a reader configured to read an image formed by an image former on a medium conveyed by a drum in a conveyance direction;

a first space accommodating the reader;

a second space downstream of the first space in the conveyance direction;

a path between the first space and the second space; and a shield configured to openably move toward the drum to close the path when the image former is forming an image on the medium, wherein the reader is:

radially arranged with respect to a rotation axis of the drum; and disposed downstream of the image former in the conveyance direction.

* * * * *